(12) United States Patent
Janusz

(10) Patent No.: US 6,332,741 B1
(45) Date of Patent: Dec. 25, 2001

(54) MASONRY ANCHOR DEVICE

(75) Inventor: Michael Janusz, Elgin, IL (US)

(73) Assignee: Textron, Inc., Providence, RI (US)

( * ) Notice: Subject to any disclaimer, the term of this patent is extended or adjusted under 35 U.S.C. 154(b) by 0 days.

(21) Appl. No.: 09/664,017

(22) Filed: Sep. 19, 2000

(51) Int. Cl.$^7$ .............................. F16B 35/04; F16B 39/30
(52) U.S. Cl. .................. 411/412; 411/309; 411/411; 411/418
(58) Field of Search .................................. 411/308, 309, 411/310, 411, 418, 420, 424, 412, 413

(56) References Cited

U.S. PATENT DOCUMENTS

| | | | |
|---|---|---|---|
| 3,133,578 | * 5/1964 | Moskovitz | 411/309 |
| 3,643,543 | * 2/1972 | Gutshall | 411/418 |
| 3,937,119 | * 2/1976 | Ernst | 411/418 X |
| 4,730,970 | * 3/1988 | Hyner et al. | 411/902 X |
| 6,086,302 | * 7/2000 | Gerhard | 411/424 X |

* cited by examiner

Primary Examiner—Neill Wilson
(74) Attorney, Agent, or Firm—Trexler, Bushnell, Giangiorgi, Blackstone & Marr, Ltd.

(57) ABSTRACT

An improved anchor device or fastening member which is particularly suited for use in the attachment of various fixtures and equipment to masonry, concrete, and other hard and/or friable substrates includes a head and a shank depending therefrom. The shank has a first threaded portion having a predetermined thread angle and a predetermined hardness, and a second threaded portion having a predetermined thread angle and a predetermined hardness. The first threaded portion is proximate to the head and the second threaded portion extends from the first threaded portion. The thread angle of the first threaded portion is different than the thread angle of the second threaded portion. In addition, the hardness of the first threaded portion is softer than the hardness of the second threaded portion. This provides for a more ductile anchorage when the fastening member is engaged with the substrate.

30 Claims, 1 Drawing Sheet

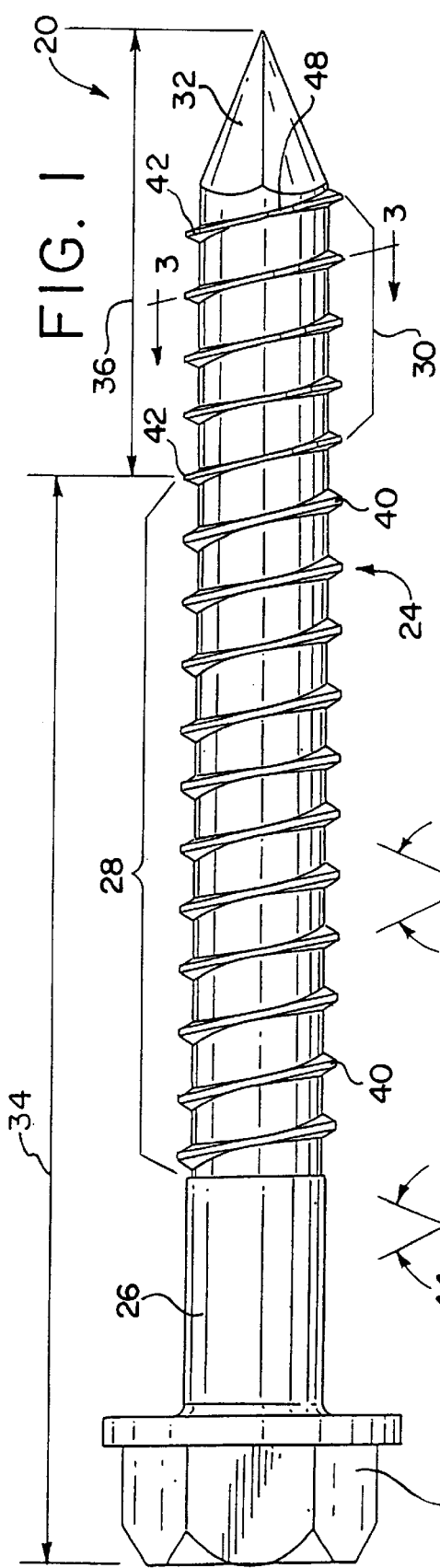
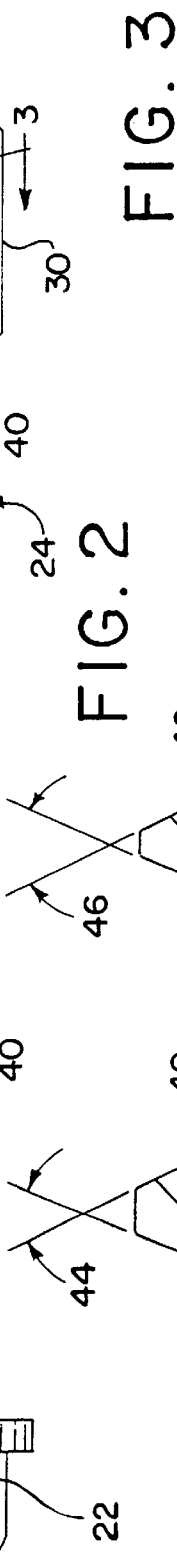
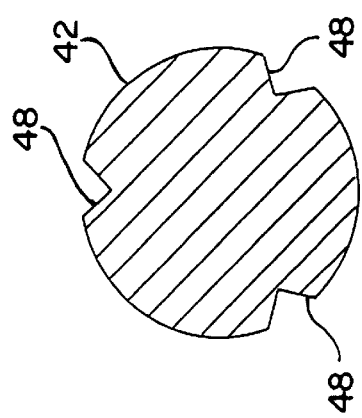

MASONRY ANCHOR DEVICE

BACKGROUND OF THE INVENTION

This invention is generally directed to a novel anchor device or fastening member which is particularly suited for use in the attachment of various fixtures and equipment to masonry, concrete, and other hard and/or friable substrates.

The prior art in one-piece, masonry tapping fasteners have uniform thread forms throughout the entire length of the fastener. They are typically heat treated to a case hardened metallurgical structure. These masonry tapping fasteners have failed for a variety of reasons, such as stripping out during the installation process, brittle failure while resisting the applied loads, and premature failure due to embrittlement and stress corrosion. As a result, users of these fasteners have been required to use other styles of fasteners that have exhibited better load versus displacement characteristics than that of a masonry tapping fasteners. These fasteners also back out of the substrate with relative ease in applications involving dynamic loads and system vibrations.

The present invention provides an anchor device or fastening member which overcomes the problems presented in the prior art and which provides additional advantages over the prior art, such advantages will become clear upon a reading of the attached specification in combination with a study of the drawings.

OBJECTS AND SUMMARY OF THE INVENTION

A general object of the present invention is to provide a novel fastening member which is particularly suited for use in the attachment of various fixtures and equipment to masonry, concrete, and other hard and/or friable substrates.

An object of the present invention is to provide a fastening member which produces a higher torque differential between the tapping torque of the thread and the strip-out torque of the fastening member, thereby resulting in a fastening member that has more inherent reliability, and the capability of being used in a wider variety of substrates versus the prior art.

Another object of the present invention is to provide a fastening member which has less overall axial movement per unit load, while resisting withdrawal forces.

Yet another object of the present invention to provide a fastening member which imparts higher radial loads on the substrate which results in large spall cones and generally higher pullout values in masonry.

A further object of the present invention is to provide a fastening member which provides a more uniform stress distribution at the surface and the upper regions of the substrate.

Yet a further object of the present invention is to provide a fastening member which has a higher resistance to dynamic loads, and system impacts and vibrations.

An even further object of the present invention is to provide a fastening member which provides an overall more ductile anchorage.

Briefly, and in accordance with the foregoing, the present invention discloses a fastening member which is particularly suited for use in the attachment of various fixtures and equipment to masonry, concrete, and other hard and/or friable substrates. The fastening member includes a head and a shank which depends therefrom. The shank has a first threaded portion having a predetermined thread angle and a predetermined hardness, and a second threaded portion having a predetermined thread angle and a predetermined hardness. The first threaded portion is proximate to the head and the second threaded portion extends from the first threaded portion. The thread angle of the first threaded portion is different than the thread angle of the second threaded portion. In addition, the hardness of the first threaded portion is softer than the hardness of the second threaded portion. This provides for a more ductile anchorage when the fastening member is engaged with the substrate.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which:

FIG. 1 is a side elevational view of a fastening member which incorporates the features of the invention;

FIG. 2 is a partial, enlarged side elevational view of the fastening member of FIG. 1; and FIG. 3 is a cross-sectional view of the fastening member along line 3—3 of FIG. 1.

DETAILED DESCRIPTION OF THE ILLUSTRATED EMBODIMENT

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

The present invention provides a novel anchor device or fastening member 20 which is particularly suited for use in the attachment of various fixtures and equipment to masonry, concrete, and other hard and/or friable substrates (not shown). The fastening member 20 may be a screw.

The fastening member 20 includes a head 22 which has a shank 24 depending therefrom. The head 22 may take a variety of forms and is dependant on the application. As shown in FIG. 1, the shank 24 includes an unthreaded portion 26 which extends from the head 22, a first threaded portion 28 which extends from the unthreaded portion 26, a second threaded portion 30 which extends from the first threaded portion 28, and a centering point 32 which extends from the second threaded portion 30. The head 22, the unthreaded portion 26 and the first threaded portion 28 form a first zone 34 of the fastening member 20. The second threaded portion 30 and the centering point 32 form a second zone 36 of the fastening member 20.

The threads 40 of the first threaded portion 28 and the threads 42 of the second threaded portion 30 are helical and have a substantially constant major diameter, minor diameter and pitch. As shown in FIG. 2, the threads 42 of the second threaded portion 30 have a smaller crest width than the threads 40 of the first threaded portion 28. As shown, the threads 42 of the second threaded portion 30 have a crest width of approximately two-thirds of the crest width of the threads 40 of the first threaded portion 28. The threads 42 of the second threaded portion 30 have a smaller volume than the threads 40 of the first threaded portion 28.

Each thread 40 of the first threaded portion 28 has a predetermined thread angle 44, and each thread 42 of the second threaded portion 30 has a predetermined thread angle 46 which is different than the thread angle 44 of the threads 40 of the first threaded portion 28. The thread angle 44 of the threads 40 of the first threaded portion 28 is three to seven degrees less than the thread angle 46 of the threads 42 of the second threaded portion 30. The preferred difference is five degrees. The type of material used for the substrate dictates what thread angle is used.

As shown in the drawings, the threads 42 of the second threaded portion 30 are at a relatively sharp thread angle 46, indicated at forty-five degrees, and the threads 40 of the first threaded portion 28 are at forty degrees thread angle 44. It is to be understood, however, that other thread angles 44, 46 can be used. For example, a fifteen degree thread angle 46 can be used in the second threaded portion 30 and a ten degree thread angle 44 can be used in the first threaded portion 28; a thirty-seven degree thread angle 46 can be used in the second threaded portion 30 and a thirty degree thread angle 44 can be used in the first threaded portion 28; a sixty-five degree thread angle 46 can be used in the second threaded portion 30 and a sixty-two degree thread angle 44 can be used in the first threaded portion 28, and the like. The thread angles 44, 46 in the first and second threaded portions 28, 30 is adjusted based upon the type of substrate with which the fastening member 20 is being engaged.

In addition, the head 22, the unthreaded portion 26 and the first threaded portion 28 which form the first zone 34 of the fastening member 20 have a predetermined hardness as measured on the Rockwell "C" scale, and the second threaded portion 30 and the centering point 32 which form the second zone 36 of the fastening member 20 have a predetermined hardness as measured on the Rockwell "C" scale which is different than the hardness of the first zone 34. In particular, the threads 40 of the first threaded portion 28 have a hardness as measured on the Rockwell "C" scale which is different than the hardness as measured on the Rockwell "C" scale of the threads 42 of the second threaded portion 30. The hardness as measured on the Rockwell "C" scale of the components of the first zone 34 is softer than the hardness as measured on the Rockwell "C" scale of the components of the second zone 36. The components of the second zone 36 are selectively heat treated to provide the higher hardness level than the components of the first zone 34. The arrangement increases the holding strength when the fastening member 20 is engaged with the substrate. The components in the first zone 34, and in particular the threads 40 of the first threaded portion 28, are approximately twenty points softer as measured on the Rockwell "C" scale than the components of the second zone 36, and in particular the threads 42 in second threaded portion 30. For example, the components in the first zone 34, and in particular the threads 40 of the first threaded portion 28, can have a hardness of twenty-five as measured on the Rockwell "C" scale, while components of the second zone 36, and in particular the threads 42 in second threaded portion 30, have a hardness of forty-five as measured on the Rockwell "C" scale. For masonry and other like substrates, it is required that the threads 42 of the second threaded portion 30 maintain at least a hardness of forty-five as measured on the Rockwell "C" scale. For other softer, yet friable substrates, this minimum hardness may not be required, and the minimum hardness differential may be different than forty-five as measured on the Rockwell "C" scale.

As such, the threads 42 of the second threaded portion 30 are harder and much sharper than the threads 40 of the first threaded portion 28. Therefore, the threads 42 of the second threaded portion 30 will cut into the substrate, such as concrete which is brittle, and form a female thread form.

Once the threads 40 of the first threaded portion 28 are engaged with the thread form as cut with the threads 42 of the second threaded portion 30, because the threads 40 of the first threaded portion 28 are softer than the threads 42 of the second threaded portion 30, the threads 40 of the first threaded portion 28 compress against the substrate and the threads of the first threaded portion 28 are compressed by the walls of the female thread form. The threads 40 of the first threaded portion 28 deform the substrate between the threads of the substrate thus, providing higher installation torque which provides a tactile feel during installation, and less tendency to fracture the substrate. In testing of this fastening member 20 versus the prior art, a twenty-one percent increase in the pullout force from a concrete test block was found.

Because the threads 40 of the first threaded portion 28 are heat treated to provide a more ductile, more malleable thread then the threads 42 of the second threaded portion 30, and because the geometry (that is, wider crest width and higher volume thread) of the threads 40 of the first threaded portion 28 provide a thread form that conforms more closely with the thread form that is tapped in the substrate by the threads 42 of the second threaded portion 30, the threads 40 of the first threaded portion 28 provide a more uniform stress distribution at the surface and the upper regions of the substrate and provide increased resistance to axial movement during withdrawal loads. This results because of the more intimate fit between the fastening member 20 and the tapped thread form in the substrate throughout the entire length of the fastening member 20.

Because of the friable nature of tapped threads in masonry, and because of the relatively high speed tapping that is typically employed in the installation of the fastening member 20, it has been observed that the resultant threads tapped into the masonry substrate are not of a true or perfect form, especially near the surface and upper area of the anchorage, where the tapping threads make multiple rotations. These multiple rotations break down the initial thread form produced by the sharper crested, lower volume, harder threads 42 provided in the second threaded portion 30 of the fastening member 20. Upon tapping the substrate, the tapped threads in an upper zone thereof spall and crush, and the resulting tapped thread is rough and less defined. The wider crested, higher volume, more malleable threads 40 provided in the first threaded portion 28 of the fastening member 20, tend to fill and conform to these more erratically shaped tapped threads found in the upper zone of the substrate.

By contrast, the bottommost thread in the tapped masonry is made in the last revolution of the fastening member 20 and is therefore inherently more defined, and more representative of the thread of the fastening member 20 in that zone. The fastening member 20 of the present invention produces an anchorage in masonry substrates and friable substrates that maintains a tighter, more intimate fit throughout the entire length of the threaded portion 28, 30 of the fastening member 20 than the prior art fastening members. This tighter, more intimate fit throughout the entire length of the threaded portion 28, 30 of the fastening member 20 improves a variety of performance characteristics over the prior art. This fastening member 20 produces a higher torque differential between the tapping torque of the thread 40, 42 and the strip-out torque of the fastening member 20, thereby resulting in a fastening member 20 that has more inherent reliability, and the capability of being used in a wider variety of substrates versus the prior art. This is especially important in those substrates that are both friable and soft, as in lightweight concrete and light weight masonry units, as well as those substrates that utilize very soft aggregates where fastening member strip-out is frequently encountered. The fastening member 20 has less overall axial movement per unit load, while resisting withdrawal forces. The fastening member 20 resists backing out, when subjected to dynamic loads, and system impacts and vibrations.

The dual zone heat treatment provides for an overall more ductile anchorage. The threads 40 of the first threaded portion 28 typically endure more abuse during the installation process, and more stress and movement once installed, but because the threads 40 of the first threaded portion 28 are more ductile, the fastening member 20 bears these more handily than the prior art. In addition, ductility is a requirement of structural fastenings, and in applications that tend to embrittle the fastening member and/or applications where stress corrosion cracking is of concern.

The larger thread angle 46 of the threads 42 of the second threaded portion 30, i.e. larger than the thread angle 44 of the threads 40 of the first threaded portion 28, produces higher radial loads in the substrate than the threads 40 of the first threaded portion 28. The increased radial load manifests itself as higher compressive forces imparted into the substrate during the act of withdrawing the fastening member 20. Higher compressive forces generated in the second threaded portion 30 of the fastening member 20 in masonry has shown to produce large spall cones and higher withdrawal resistance. A five degree differential in the thread angle 44, 46 has been calculated to impart a fourteen percent increase in radial loading. The fastening member 20 biases the higher radial loads in the second threaded portion 30 of the fastening member 20, and lesser radial loads in the upper zones of the substrate, where in many cases, the surface of the substrate is unsupported and prone to premature spalling.

A plurality of notches 48 are provided in the threads 42 of the second threaded portion 30. As shown, three equidistantly spaced notches 48 are provided in each thread 42 of the second threaded portion 30. As shown in FIG. 3, each notch 48 is "V" shaped, however it is to be understood that other shapes, such as a "U" shape can be used. In addition, while three equidistantly spaced notches 48 are shown, it is to be understood that more or less than three notches can be provided and the notches do not need to be equidistantly spaced. The shape, amount and spacing of the notches 48 is dependant upon the type of substrate used. The notches 48 are used to cut the friable substrate during tapping of the female thread in the substrate.

While the transition of the thread angle 44, 46 from the threads 42 in the second threaded portion 30 to the threads 40 in the first threaded portion 28 is shown as an abrupt change, it is to be understood that this change can be formed by blending the thread angle down along a plurality of the threads 40 in the first threaded portion 28.

While the unthreaded portion 26 is shown in the drawings, it is to be understood that the unthreaded portion 26 can be eliminated and instead, the first threaded portion 28 can extend to the head 22 of the fastener member 20.

While a preferred embodiment of the present invention is shown and described, it is envisioned that those skilled in the art may devise various modifications of the present invention without departing from the spirit and scope of the appended claims.

The invention claimed is:

1. A fastening member comprising:
   a head; and
   a shank depending from said head, said shank having a first threaded portion having a predetermined thread angle and which is proximate to said head, and a second threaded portion having a predetermined thread angle and extending from said first threaded portion, said thread angle of said first threaded portion being different than said thread angle of said second threaded portion, said threads in said first threaded portion and said threads in said second threaded portion have a substantially constant minor diameter.

2. A fastening member as defined in claim 1, further including a centering point provided on said second threaded portion.

3. A fastening member as defined in claim 1, wherein said threads in said first threaded portion and said threads in said second threaded portion have a substantially constant major diameter and pitch.

4. A fastening member as defined in claim 1, wherein said threads in said first threaded portion are helical and said threads in said second threaded portion are helical.

5. A fastening member as defined in claim 1, wherein each said thread in said second threaded portion has at least one notch provided therein.

6. A fastening member as defined in claim 5, wherein each said notch is "V" shaped.

7. A fastening member as defined in claim 1, wherein said thread angle of said first threaded portion is three to seven degrees different than said thread angle of said second threaded portion.

8. A fastening member comprising:
   a head; and
   a shank depending from said head, said shank having a first threaded portion having a predetermined thread angle and which is proximate to said head, and a second threaded portion having a predetermined thread angle and extending from said first threaded portion, said thread angle of said first threaded portion is three to seven degrees different than said thread angle of said second threaded portion.

9. A fastening member as defined in claim 8, further including a centering point provided on said second threaded portion.

10. A fastening member as defined in claim 8, wherein said threads in said first threaded portion and said threads in said second threaded portion have a substantially constant major diameter, minor diameter and pitch.

11. A fastening member as defined in claim 8, wherein said threads in said first threaded portion are helical and said threads in said second threaded portion are helical.

12. A fastening member as defined in claim 8, wherein each said thread in said second threaded portion has at least one notch provided therein.

13. A fastening member as defined in claim 12, wherein each said notch is "V" shaped.

14. A fastening member comprising:
   a head; and
   a shank depending from said head, said shank having a first, hardened threaded portion having a predetermined hardness and which is proximate to said head, and a second, hardened threaded portion having a predetermined hardness and extending from said first threaded portion, said hardness of said first threaded portion being softer than said hardness of said second threaded portion.

15. A fastening member as defined in claim 14, wherein said hardness of said threads in said second threaded portion is at least twenty points harder than said threads of the first threaded portion as measured on the Rockwell "C" scale.

16. A fastening member as defined in claim 14, wherein said hardness of said threads in said second threaded portion is at least forty-five as measured on the Rockwell "C" scale.

17. A fastening member as defined in claim 14, further including a centering point provided on said second threaded portion.

18. A fastening member as defined in claim 14, wherein said threads in said first threaded portion and said threads in said second threaded portion have a substantially constant major diameter, minor diameter and pitch.

19. A fastening member as defined in claim 14, wherein said threads in said first threaded portion are helical and said threads in said second threaded portion are helical.

20. A fastening member as defined in claim 14, wherein each said thread in said second threaded portion has at least one notch provided therein.

21. A fastening member as defined in claim 20, wherein each said notch is "V" shaped.

22. A fastening member comprising:

a head; and a shank depending from said head, said shank having a first threaded portion having a predetermined thread angle and a predetermined hardness, said first threaded portion being proximate to said head, and a second threaded portion having a predetermined thread angle and a predetermined hardness, said second threaded portion extending from said first threaded portion, said thread angle of said first threaded portion being different than said thread angle of said second threaded portion and said hardness of said first threaded portion being softer than said hardness of said second threaded portion.

23. A fastening member as defined in claim 22, wherein said thread angle of said first threaded portion is three to seven degrees different than said thread angle of said second threaded portion.

24. A fastening member as defined in claim 22, wherein said hardness of said threads in said second threaded portion is at least twenty points harder than said threads of the first threaded portion as measured on the Rockwell "C" scale.

25. A fastening member as defined in claim 22, wherein said hardness of said threads in said second threaded portion is at least forty-five as measured on the Rockwell "C" scale.

26. A fastening member as defined in claim 22, further including a centering point provided on said second threaded portion.

27. A fastening member as defined in claim 22, wherein said threads in said first threaded portion and said threads in said second threaded portion have a substantially constant major diameter, minor diameter and pitch.

28. A fastening member as defined in claim 22, wherein said threads in said first threaded portion are helical and said threads in said second threaded portion are helical.

29. A fastening member as defined in claim 22, wherein each said thread in said second threaded portion has at least one notch provided therein.

30. A fastening member as defined in claim 29, wherein each said notch is "V" shaped.

* * * * *